United States Patent [19]

Gerber et al.

[11] Patent Number: 5,256,238
[45] Date of Patent: Oct. 26, 1993

[54] VERTICALLY REMOVABLE AND EMPLACABLE TOOL CARRIAGE FOR USE WITH A PLURALITY OF WORK SUPPORTING TABLES

[75] Inventors: H. Joseph Gerber, West Hartford; Richard S. Szewczyk, Madison; Fredric K. Rosen, Weston, all of Conn.

[73] Assignee: Gerber Garment Technology, Inc., Tolland, Conn.

[21] Appl. No.: 983,621

[22] Filed: Nov. 30, 1992

Related U.S. Application Data

[63] Continuation of Ser. No. 639,789, Jan. 10, 1991.

[51] Int. Cl.$^5$ ............................................. B32B 31/00
[52] U.S. Cl. ..................................... 156/361; 156/510; 156/517; 29/426.3; 29/563; 83/174; 83/468; 112/121.12; 112/121.15; 112/121.25; 112/121.14; 112/131
[58] Field of Search .................. 156/361, 510, 517; 29/563, 568, 426.3; 83/174, 468; 112/121.12, 121.15, 121.25, 121.14, 131

[56] References Cited

U.S. PATENT DOCUMENTS

| | | |
|---|---|---|
| 2,892,555 | 7/1957 | Hooker . |
| 3,024,925 | 5/1959 | Werner et al. . |
| 3,548,502 | 12/1970 | Baldwin ............................ 112/131 |
| 3,754,520 | 8/1973 | Bennison ...................... 112/121.12 |
| 3,765,349 | 10/1973 | Gerber ................................ 112/131 |
| 4,116,098 | 9/1978 | Suzuki et al. ..................... 83/425.4 |
| 4,433,632 | 2/1984 | Becka et al. ................... 112/121.12 |
| 4,459,732 | 7/1984 | Driggers ........................... 29/426.3 |
| 4,508,233 | 4/1985 | Helms . |
| 4,521,006 | 9/1985 | Waters .................................. 83/468 |
| 4,591,402 | 5/1986 | Evans et al. ......................... 156/523 |
| 4,597,498 | 7/1986 | Spinosa et al. . |
| 4,748,922 | 6/1988 | Bierbaum et al. .................... 112/131 |
| 4,883,009 | 11/1989 | Haselberger et al. .......... 112/121.14 |
| 5,033,343 | 7/1991 | Gerber .................................. 83/74 |
| 5,040,473 | 8/1991 | Zesch et al. ..................... 112/121.14 |
| 5,061,331 | 10/1991 | Gute .................................... 156/251 |
| 5,081,943 | 1/1992 | Nakanishi ....................... 112/121.12 |
| 5,088,181 | 2/1992 | Jeppsson .............................. 29/563 |

Primary Examiner—David Simmons
Assistant Examiner—Merrick Dixon
Attorney, Agent, or Firm—McCormick, Paulding & Huber

[57] ABSTRACT

A carriage for carrying a labeller, bundler or similar tool for working on sheet material spread on a supporting table is moveable vertically and transversely relative to such table by an associated lifting and transport cart allowing the carriage to be lifted from one table and transported to another table at which it is lowered onto the new table to bring it into working relationship therewith. The carriage may be engaged by the cart from the side or end of the table. Accordingly, the carriage may be moved from one table to another even in cases where the carriage can not be easily moved onto or off of the end of a table because of such table end being inaccessible. Means hold the carriage against vertical and lateral movement relative to the table while the carriage is in working relationship therewith, and these means are moveable to disengaged positions to free the carriage for vertical movement relative to the table when removing the carriage from or placing it onto the table.

16 Claims, 8 Drawing Sheets

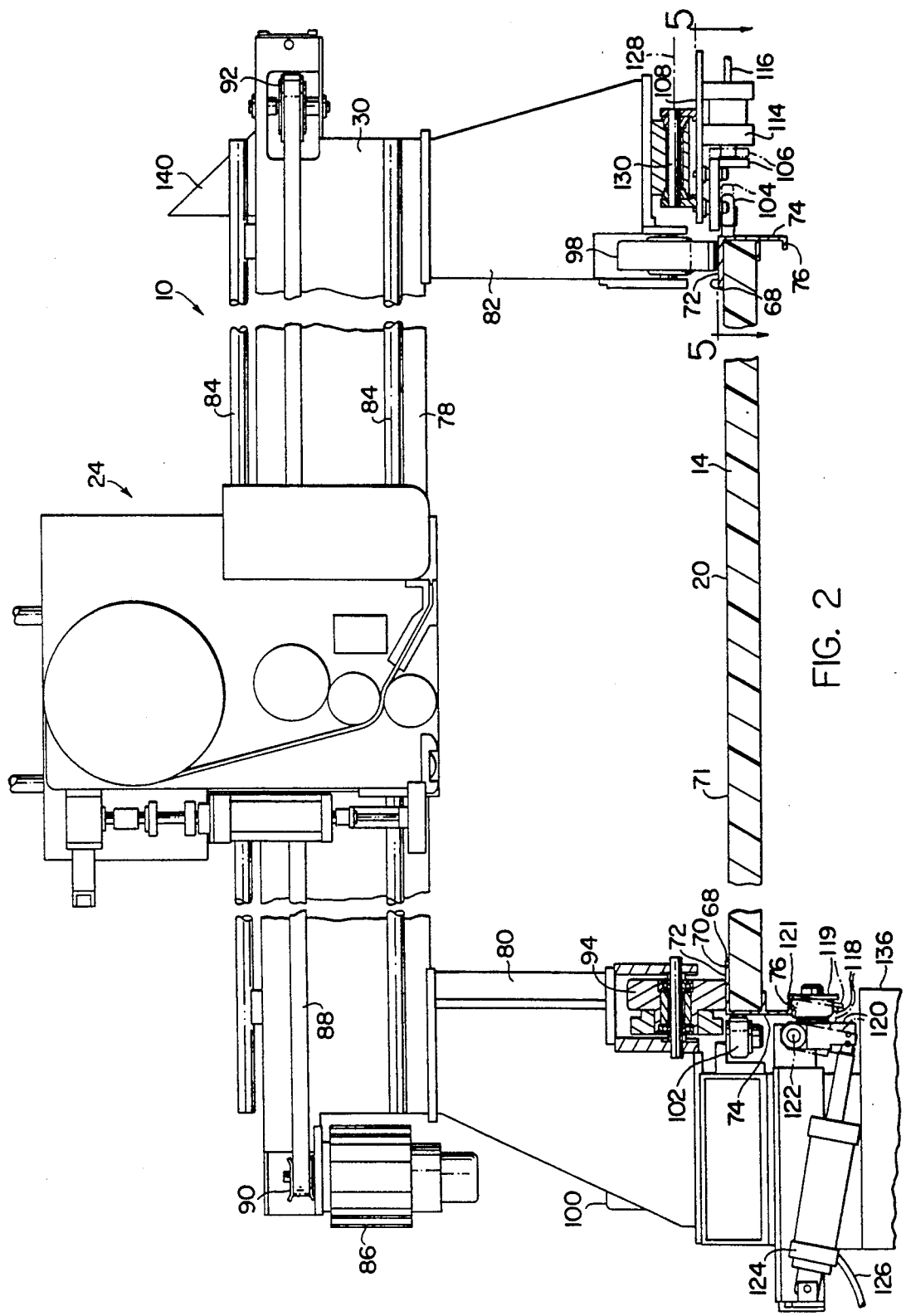

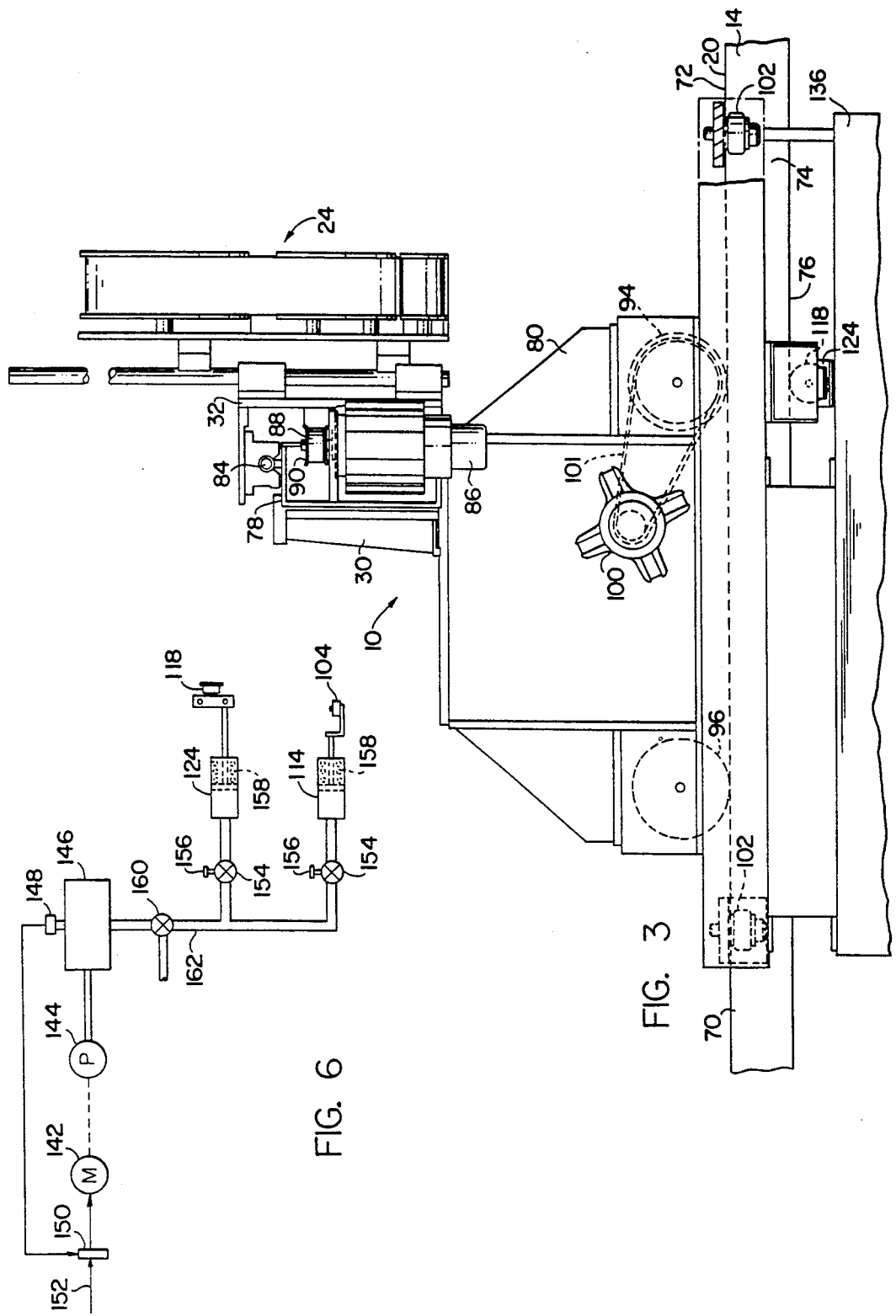

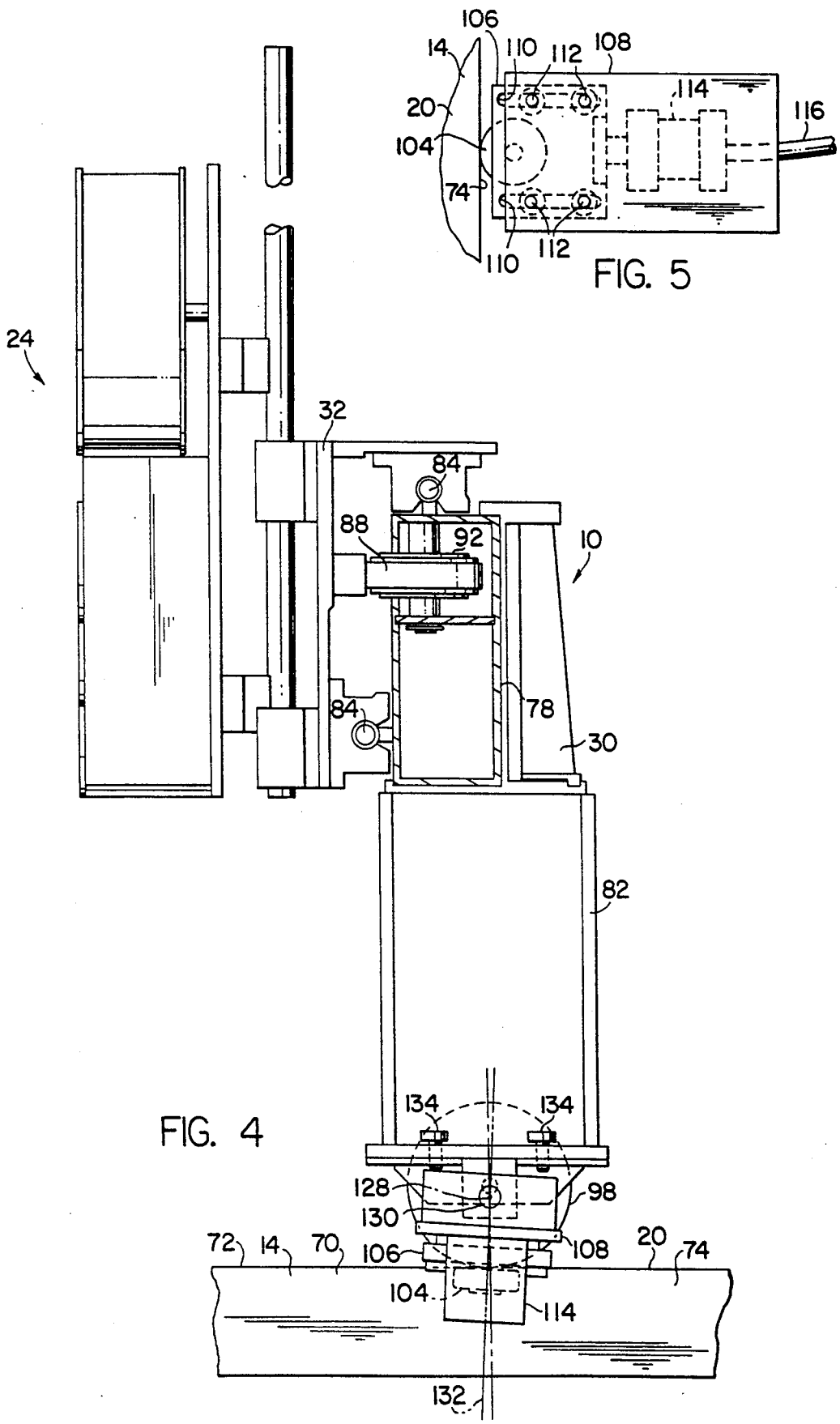

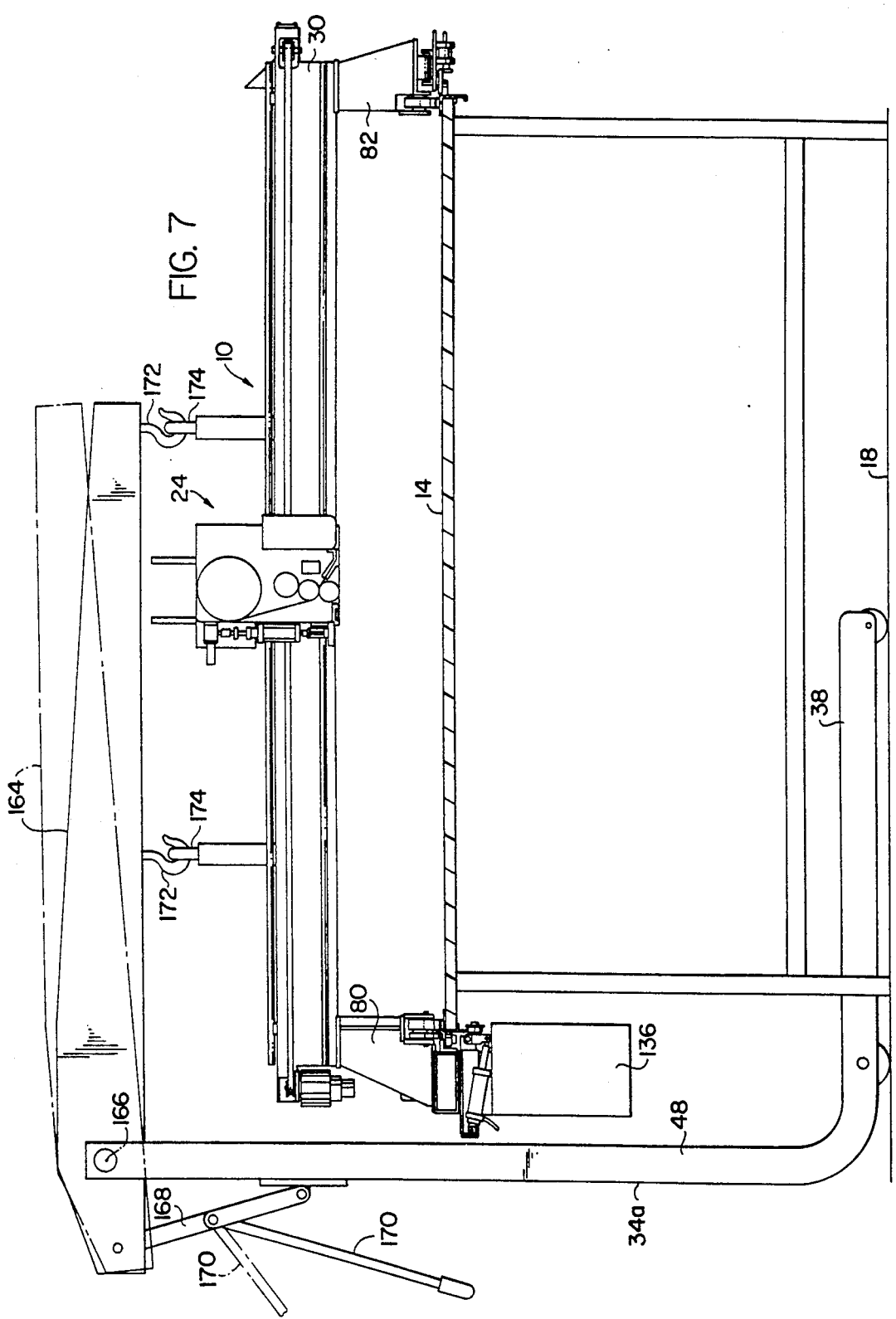

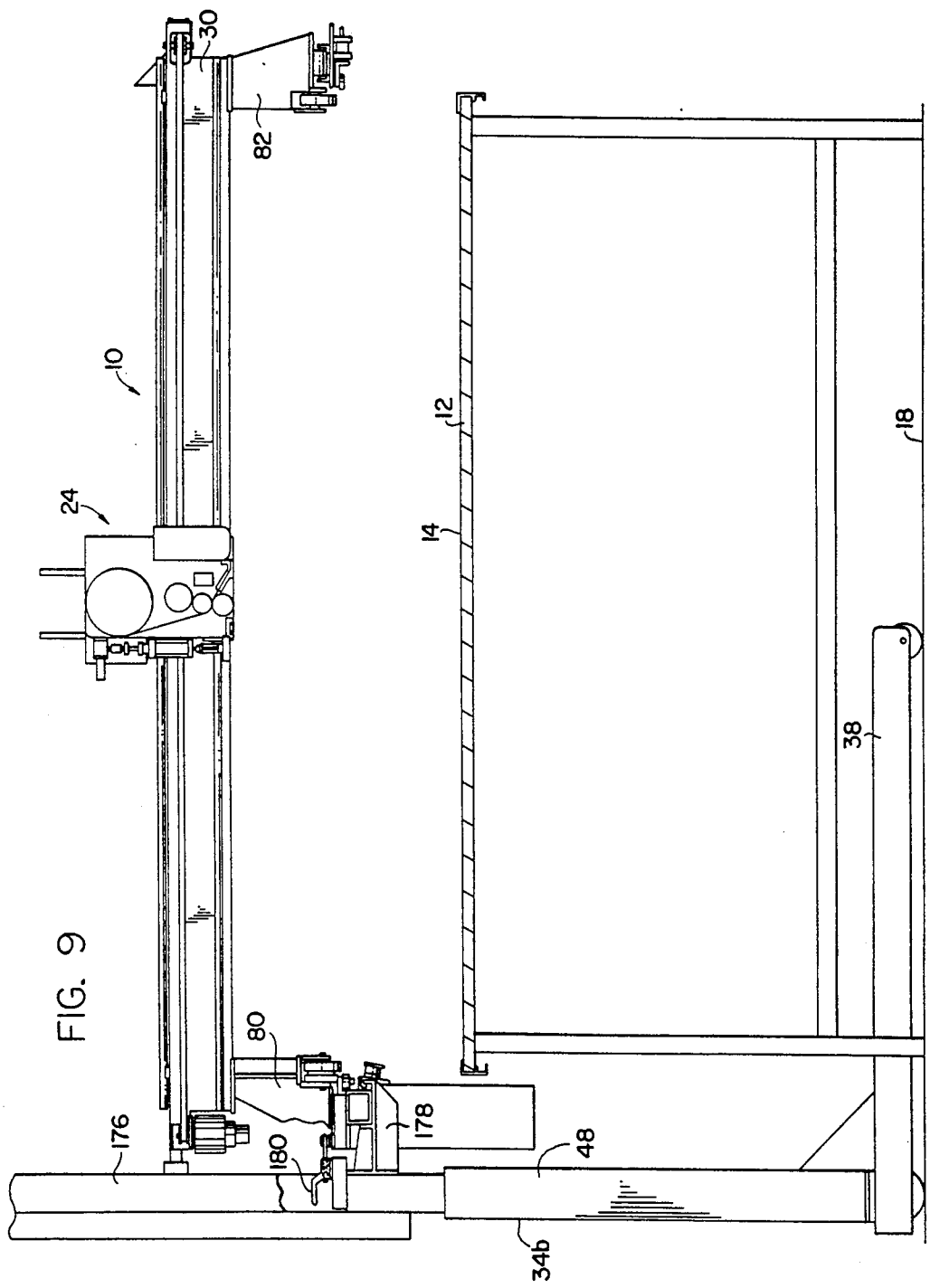

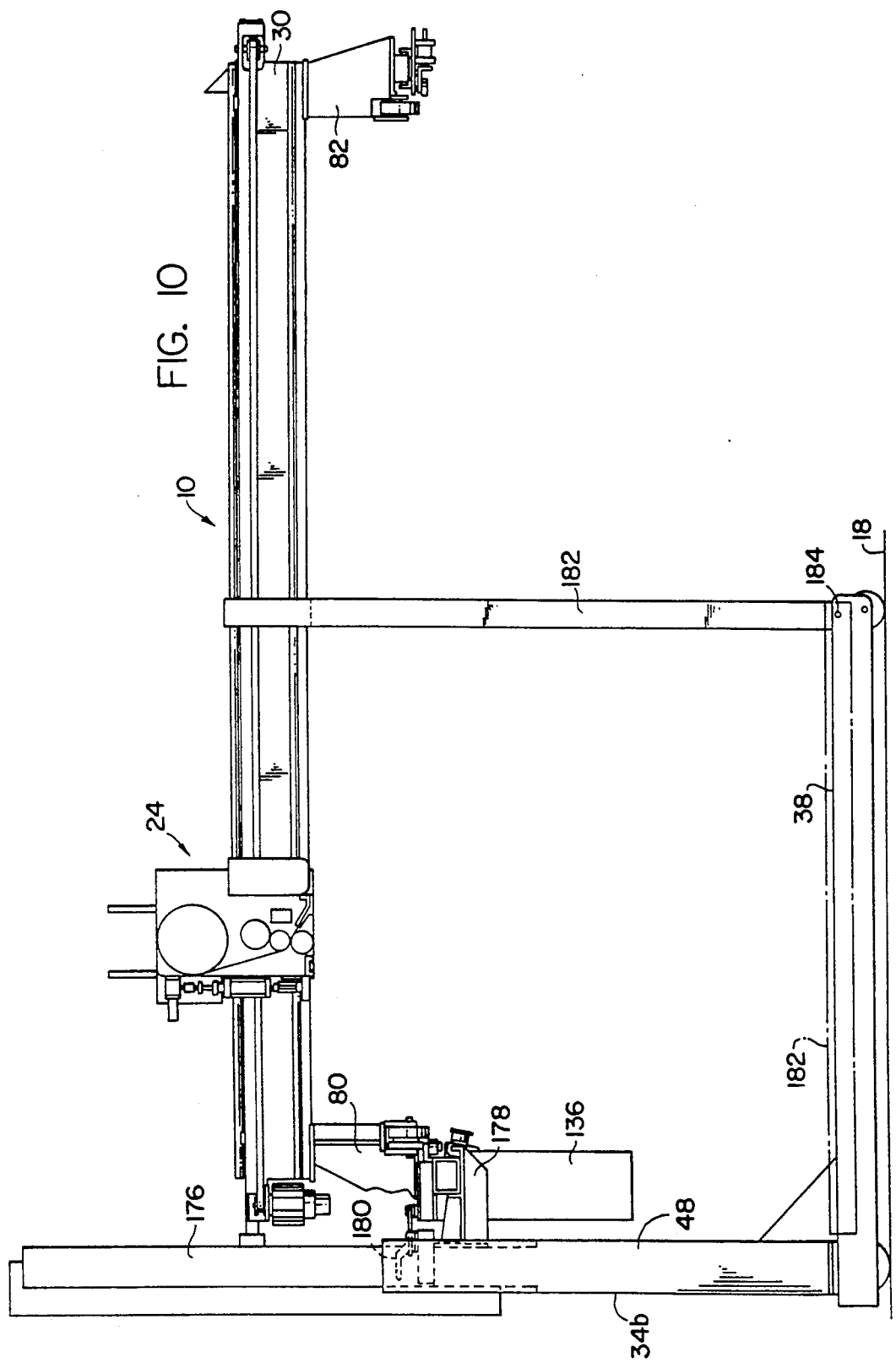

VERTICALLY REMOVABLE AND EMPLACABLE TOOL CARRIAGE FOR USE WITH A PLURALITY OF WORK SUPPORTING TABLES

This is a continuation of co-pending application Ser. No. 07/639,789 filed on Jan. 10, 1991.

BACKGROUND OF THE INVENTION

This invention relates to the cutting of pattern pieces from fabric and similar sheet material spread either as a single layer or as a multiple layered lay-up on a supporting surface, and deals more particularly with improvements in the construction of a carriage for supporting and moving a work tool, such as a labeller or bundler, relative to spread sheet material supported by a supporting table, with the improvements permitting the carriage, by means of a related lifting and transport cart, to be readily moved into and out of working relationship with a table and to be transported from one table to another.

The work tool carriage, and its related lifting and transport cart, of this invention may be used in association with various different tools for working on or processing sheet material supported by a supporting table and from which material pattern pieces have been or are to be cut for use in making clothing, upholstery or the like. As an example, the tool carriage of the invention lends itself particularly well to use with a labeller such as shown and described in pending U.S. patent application Ser. No. 07/585,711 filed on Sep. 19, 1990, with the carriage and labeller being positioned relative to the sheet material by a drive and control system built into the carriage and responsive to position information associated with each label. Therefore, the invention is hereinafter illustrated and described with the involved work tool taken to be such a labelling mechanism. In doing so, however, it should be understood that there is no intention to limit the invention in its broader aspects to a labeller carriage.

Tool carriages of the type with which the invention is concerned move longitudinally of the work supporting tables with which they become associated and include a work tool supporting sub-carriage moveable relative to the main frame of the tool carriage in the direction extending transversely of the associated table so that the tool carried by the sub-carriage can be positioned in X and Y coordinates relative to the table to bring it to any point on the top surface of the sheet material supported by the table by combined movement of the main frame longitudinally of the table and of the sub-carriage transversely of the main frame and table. In the case of such carriages, it is also known, for example from U.S. Pat. No. 3,776,074, to transfer the carriage from one table to another by use of a transfer table or wagon moveable from a position at the end of one table to a position at the end of another table. To effect a transfer, the work tool carriage is moved longitudinally of its present work table and off the end of that table onto the transfer table. The transfer table is then moved to the end of a new work table and the carriage then moved longitudinally of the new work table off of the transfer table and onto the new work table. Because spreaders and other tool carriages may be used with the work tables in question, or because access to the ends of the work tables may be hindered by other factors, this method of transferring a carriage by running it onto and off of the ends of the tables is not always efficient or possible.

The general object of the invention is therefore to provide a construction for a work tool carriage which permits the carriage to be readily removed from or placed onto a table not only from an end of the table, but also from the side of the table and at substantially any selected point along the length of the table, thereby permitting the carriage to be removed from and placed on a work table despite the fact that access to the table from one or both of its ends may be difficult to achieve due, for example, to the construction of the table, the placement of the table relative to other machines or equipment, or the presence on the table of a spreader or other work carriage.

Along with the preceding object a further object of the invention is to provide a tool carriage which in addition to being removable from and replaceable on a table from an end or a side of the table by moving it vertically relative to the table may also, if desired and if conditions permit, be removable and replaceable relative to a table by being moveable horizontally off of or onto the end of a table and onto or off of a transfer table or wagon temporarily positioned at the end of the table, so as to form a continuation thereof, and which transfer table is movable from the end of one table to the end of another.

A further object of the invention is to provide a work carriage of the above character including means for positively holding the carriage to the table during its period of working on the sheet material carried by the table and which means is moveable to a released position to allow the carriage to be lifted or lowered vertically from or onto the table with the means for operating the holding means being electrically powered and contained on the carriage along with electrically powered means for otherwise driving and controlling the carriage so that the carriage need only be connected to a source of electrical power to make it operable.

A yet further object of the invention is to provide, in combination with a work tool carriage of the character defined in the preceding objects, a lifting and transport cart of simple construction and of easy manual operation for moving the work tool carriage generally vertically from and onto a table, which cart is moveable by an operator transversely of a table to move the carriage out of and into a position above the table and to move the carriage from one table to another.

Other objects and advantages of the invention will be apparent from the following detailed description of preferred embodiments thereof, and from the accompanying drawings and claims.

SUMMARY OF THE INVENTION

The invention resides in a carriage for supporting a labeller, bundler or similar tool, for working on sheet material spread on a supporting table and for movement of the tool in X and Y coordinate directions relative to the work material, the carriage also being moveable vertically and transversely of the table into and out of working relationship with the table to allow it to be moved from one table to another by an associated lifting and transport cart.

More specifically, the invention resides in the work tool carriage comprising a main frame adapted to extend transversely across a table and having first and second end portions located respectively at the opposite sides of the table, a number of top wheels on the end portions of the main frame engagable with a table to support the frame for movement longitudinally of the table, a number of side wheels engagable with the sides of a table to restrain the main frame against lateral movement relative to the table, and at least one bottom wheel carried by at least one of the end portions of the main frame engagable with the bottom of the table and moveable between engaged and disengaged positions. In its engaged position the bottom wheel serves the purpose of restraining the main frame against vertical movement relative to the table, while in its disengaged position the bottom wheel is positioned outboard of the table to free the main frame for vertical lifting movement to and from the table.

The invention also resides in the side wheel or wheels associated with one of the ends of the main frame being moveable between engaged and disengaged positions, the main frame in the disengaged position of the side wheel or wheels being freed for vertical movement relative to the table without hindrance by the side wheels.

The invention also resides in further details defined in the appended claims.

BRIEF DESCRIPTION OF THE DRAWINGS

FIG. 2 is a front elevational view of the carriage of FIG. 2 taken generally on the line 2—2 of FIG. 1.

FIG. 3 is an end elevational view of the carriage of FIG. 1 taken looking toward the right in FIG. 2.

FIG. 4 is an end view of the carriage of FIG. 1 taken looking toward the left in FIG. 2.

FIG. 5 is a horizontal sectional view taken on the line 5—5 of FIG. 2.

FIG. 6 is a schematic view showing the pressurized air supply system for operating the air cylinders of the carriage of FIG. 1.

FIG. 7 is a schematic vertical sectional view showing the carriage of FIG. 1 in association with an alternate form of lifting and transport cart and in the process of being moved vertically relative to the table by the cart.

FIGS. 8, 9 and 10 are views similar to FIG. 6 but show the tool carriage in the process of being lifted from a table by another form of lifting and transport cart.

DETAILED DESCRIPTION OF THE PREFERRED EMBODIMENTS

Figure 1:
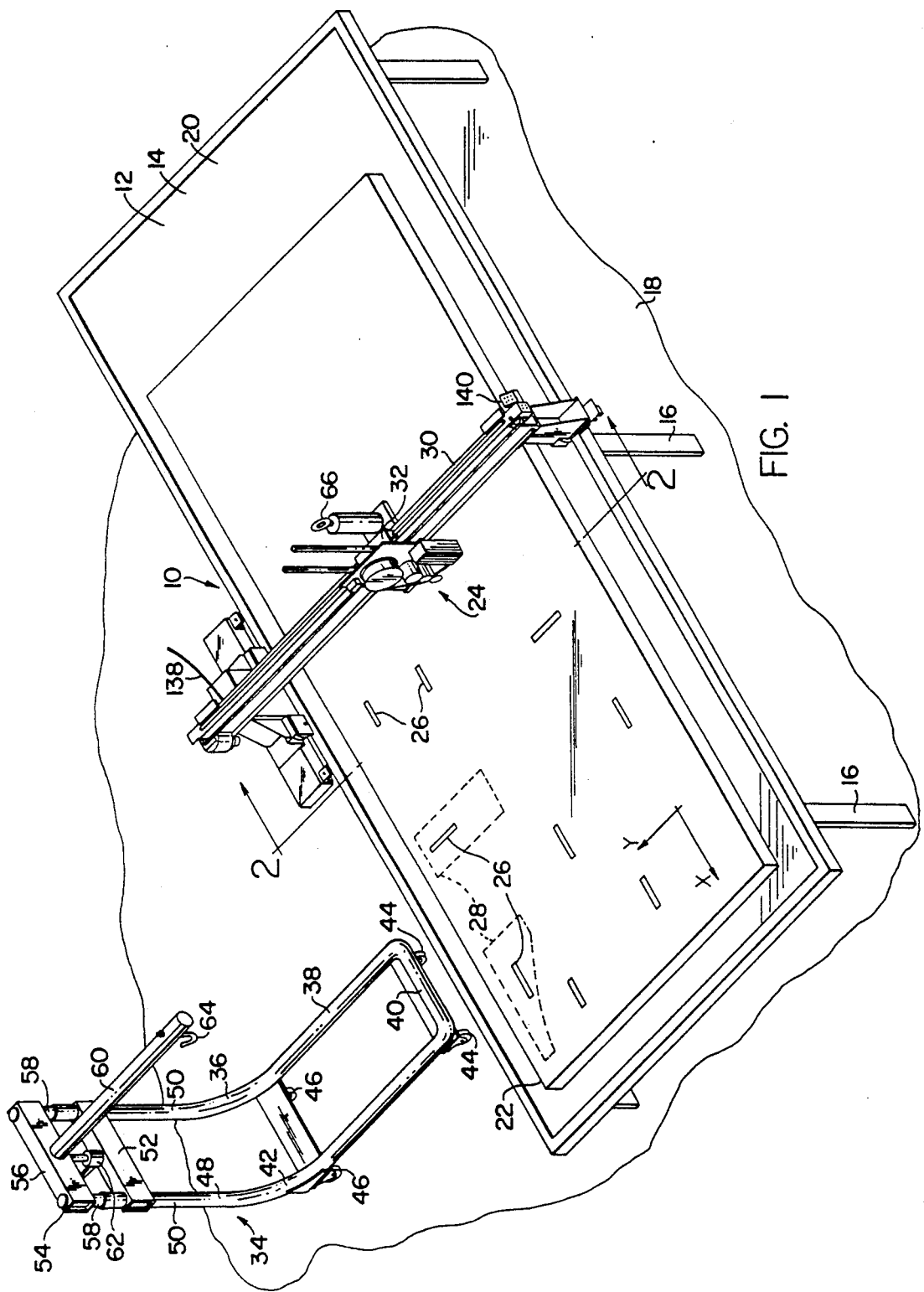
FIG. 1 is a schematic perspective view showing a tool carriage embodying the invention in working relationship with a work material supporting table and also showing an associated lifting and transport cart for the carriage.

Turning first to FIG. 1, a carriage 10 embodying the invention is there shown in working relationship with a table 12 having a top 14 supported by legs 16 above a floor 18. The top 14 of the table provides an upwardly facing supporting surface 20 for supporting sheet material to be worked upon. Such sheet material may consist of a single layer or, as shown in the figure, may be a lay-up 22 of superimposed sheets of fabric or other sheet material. The table 12 may be one designed and intended to hold the sheet material during the performance of various different work procedures on the material. For example, the table may be a spreading table for holding the material while it is being spread in preparation for later cutting, a cutting table for holding the material while being cut, or a take-away table for holding the material subsequent to its cutting and while the cut pattern pieces are removed from the waste material. In the illustrated instance the table 12 is taken to be a spreading table.

In FIG. 1 the carriage 10 is illustrated as being used to support a labeller 24 for applying labels 26 to the top surface of the lay-up 22 to identify pattern pieces later to be cut from the lay-up, two such pattern pieces being shown by broken lines in FIG. 1 at 28. The labeller 24 may take various different forms, but preferably it is one such as shown by U.S. patent application Ser. No. 07/585,177, to which reference is made for further details of its construction, wherein the labels 26 used by the labeller each have associated with it a position code read by a reading device in the labeller and used to control the operation of the carriage and labeller so that each label is placed on the top surface of the lay-up 22 at the position dictated by the label's position code. To permit such positioning of the labels 26 at predetermined positions on the top surface of the lay-up, the carriage 10 includes a main frame 30 extending transversely across the table top 14 above the lay-up 22 and moveable longitudinally of the table in the illustrated X coordinate direction. The main frame 30 carries a sub-carriage 32 moveable along the length of the main frame, in the illustrated Y coordinate direction, and carrying the labeller 24. Therefore, by combined movements of the main frame 30 in the X coordinate direction, or along the length of the table, and movement of the sub-carriage 32 in the Y coordinate direction, or transversely of the table, the labeller 24 may be moved to any position on the top surface of the lay-up 22 to apply a label at such position.

A feature of the invention is that the carriage 10 is moveable vertically relative to the table 12 into and out of its working relationship with the table, and when it is in a position raised from that of FIG. 1 it may be moved transversely or sidewise from the table to completely disassociate it from the table and allow it to be transported to and be placed into working relationship with another table. To perform this lifting and transport function, the carriage has associated with it a lifting and transport cart 34.

The lifting and transport cart 34 comprises a base 36 having a lower portion 38 with a front end 40 and rear end 42. Near the front end 40 are two swivelling caster wheels 44 and near the rear end 42 are two non-swivelling caster wheels 46, which caster wheels support the cart for movement over the floor 18. Extending upwardly from the rear end 42 of the lower portion 38 is a vertical portion 48 consisting of two vertical tubes 50 connected at their upper ends by a horizontal cross bar 52. The cart 34 also includes a lifting structure 54 liftingly engagable with the carriage 10 and moveable vertically relative to the base 38. This lifting structure comprises a body, in the form of a horizontal cross bar 56 having fixed thereto two rods 58 slidably received in the tubes 50 of the vertical base portion, and a lifting arm 60 fixed to the body 56 and extending horizontally outwardly therefrom generally parallel to the lower portion 38 of the base. The lifting structure 56 can be manually raised or lowered relative to the base by means of a hand-operated jack 62 working between the cross bar 52 and body 56. Cooperable engagement means are provided on the lifting arm 60 and on the main frame 30 of the carriage 10 to allow the lifting arm 60 to be releasably liftingly engaged with the main frame. This cooperable engagement means may take various different forms and in FIG. 1 is shown to comprise a hook 64 carried by the outer end of the lifting arm 60 and an eye 66 fixed to the main frame 30.

The lower portion 38 of the base of the cart 34 is of such a low height that it may be moved under the table top 14 to bring the vertical portion 48 of the cart close to the side of the table and to bring the hook 64 into lifting engagement with the eye 66. Thereafter, by operation of the jack 62 the lifting arm 60 may be raised to lift the carriage vertically from the table and thereafter the cart may be moved sidewise from the table and then used to transport the carriage from the illustrated table of FIG. 1 to another similar table with which the carriage and labeller are to be used. When reaching the new table the cart is moved sidewise of that table to insert its lower portion under the table and to bring the carriage 10 into a position above the table's supporting surface. Thereafter the jack 62 is operated to lower the carriage into working relationship with the new table whereupon the hook 64 is disengaged from the eye 66 and the cart 30 removed to an out of the way place.

Further details of the construction of the carriage 10 may be had by reference to FIGS. 2-5. As shown in these figures the table top 14, as best seen in FIG. 2, has two marginal edge portions 68 extending respectively along its two side edges and each including a longitudinally extending metallic roll form 70 attached to a panel 71 forming the main portion of the top. Each extrusion 70 provides an upwardly facing horizontal top surface 72, an outwardly facing side surface 74 and a downwardly facing bottom surface 76. The main frame 30 of the work tool carriage 10, as shown by FIGS. 2-5, includes a horizontal beam 78 supported at its opposite ends by two end portions 80 and 82 each associated with a respective one of the marginal edge portions 68 of the table. The beam 78 carries two horizontal parallel guide ways 84 supporting the sub-carriage 32 for movement along the length of the beam 78 with such movement being effected by a drive and positioning electric motor 86, carried by the beam 78, and a belt 88 fixed to the sub-carriage and trained over a first pulley 90 driven by the motor 86 and an idler pulley 92 at the opposite side of the beam.

The main frame 30 is supported for movement longitudinally of the table top 14 by three top wheels 94, 96 and 98 rollingly engageable with the upwardly facing top surfaces 72 of the table. The two top wheels 94 and 96 are carried by the main frame end portion 80, as best seen in FIG. 3, for rotation about horizontal axes extending transversely across the table and are spaced from one another along the length of the table. One of these two wheels, namely the wheel 94, is driven by a drive motor 100, carried by the main frame end portion 80, through a belt 101, to propel and position the main frame 30 along the length of the table. The third top wheel 98 is carried by the main frame end portion 82 and also rotates about a horizontal axis extending transversely of the table.

The carriage 10 includes a means for restraining it against lateral movement relative to the table when in working relationship therewith. In the illustrated case, this means includes two side wheels 102 carried by the main frame end portion 80 for rotation about vertical axes and engageable with the adjacent side surface 74 of the table. This means also includes a third side wheel 104 carried by the other end portion 82 of the main frame and also rotatable about a vertical axis and engageable with the adjacent side surface 74. As shown in FIG. 3, the two side wheels 102 carried by the end portion 80 are spaced along the length of the table by a spacing greater than that of the two top wheels 94 and 96 with the two top wheels 94 and 96 being located between the side wheels 102.

The side wheel 104 carried by the end portion 82 of the main frame is located midway between the two end wheels of the opposite end portion 80 and is moveable toward and away from its associated side surface 74 of the table. Further, while the carriage 10 is in working relationship with the table this wheel 104 is urged toward its side surface 74 so that the table is laterally clamped between the two side wheels 102 of the end portion 80 and the one side wheel 104 of the end portion 82 to eliminate any lateral play of the main frame 30 relative to the table. To achieve this functioning of the side wheel 104 it is carried by a mounting bracket 106 slidable relative to an intermediate plate 108 by virtue of the bracket having elongated slots 110 receiving support posts 112 fixed to the plate 108. The plate 108 also carries a pneumatic cylinder 114 which when supplied with pressurized air by the associated supply line 116 urges the mounting bracket 106 to the left as seen in FIG. 2 to urge the wheel 104 into engagement with the adjacent side table surface 74. When air pressure is removed from the supply line 116 an internal spring in the actuator 114 moves the bracket 106 rightwardly to the broken line position shown in FIG. 2 to remove the wheel 104 from engagement with the adjacent surface 74 thereby freeing the main frame 30 of the carriage for vertical movement relative to the table top without hindrance by the side wheels 102 and 104.

The tool carriage 10 also includes a means for restraining the main frame 30 against movement vertically relative to the table top 14 while the carriage is in working relationship therewith. In the illustrated case this restraining means comprises a bottom wheel 118 carried by the main frame end portion 80 and engageable with the associated bottom surface 76 of the table top and rotatable about a horizontal axis extending transversely of the table. This bottom wheel is further urged into tight engagement with the bottom surface 76 and is vertically aligned with the drive wheel 94 so that the table top is clamped between the top drive wheel 94 and the bottom wheel 118 to both eliminate vertical looseness between the table top and the main frame 30 and to also aid gravity in pressing the top drive wheel 94 tightly against the associated top surface 72 to assure a positive drive engagement between the outer surface of the drive wheel 94 and the top surface 72 of the table. Further, with the bottom wheel 118 being vertically aligned with the top drive wheel 94 these two wheels exert no bending movement on the extrusion 70 which, if the extrusion 70 is made in lengthwise sections, might at a joint between two sections cause the end of one section to become vertically displaced from the other.

The means for urging the wheel 118 toward the associated bottom surface 76 includes a bracket 120 on which the bottom wheel 118 is mounted and which is rotatable relative to the end portion 80 about a horizontal axis 122 extending parallel to the length of the table. Working between the bracket 120 and the end portion 80 is a pneumatic cylinder 124. When the cylinder is supplied with pressurized air through the supply line 126 it operates to urge the bracket 120 in the counter-clockwise direction as seen in FIG. 2 to urge the wheel 118 into firm engagement with the associated table bottom surface 76. When the pressurized air is removed from the cylinder 124 an internal spring in the cylinder rotates the bracket 120 clockwise, as seen in FIG. 2, to the illustrated broken line position at which the bottom wheel 118 is located to the left or outboard of the associated side surface 74 of the table thereby freeing the main frame 30 of the carriage for vertical movement relative to the table.

No bottom wheel is associated with the right-hand end portion 82 of the main carriage, as seen in FIG. 2. However, preferably the side wheel 104 of the end portion 82 is designed to aid gravity in urging the end portion 82 downwardly relative to the table as the main frame is moved longitudinally of the table. Such a downward force created by the engagement of the side wheel 104 with the adjacent side surface 74 of the table may be achieved in various different ways. In the illustrated case it is achieved by mounting the plate 108, as best seen in FIGS. 2 and 4, to the main frame end portion 82 for rotation relative to the end portion 82 about a horizontal axis 128 extending transversely of the table, as by means of a pivot pin 130, to allow the rotational axis 132 to rotate a limited amount about the axis 128, such limited amount of rotation being determined by two adjustable stop screws 134 (FIG. 4) threadably received by the end portion 82 and engagable with the plate 108 to limit its rotation in both directions about the axis 128. Therefore, when the main frame 30 is moved in one direction or the other along the length of the table top 14 the roller 104 rotates the plate 108 to bring it into engagement with one or the other of the stop screws 138 to cause its rotational axis 132 to be slightly inclined from the vertical. That is, the rotational axis 132 will extend upwardly and slightly forwardly with respect to the direction of movement of the main frame 30 so that the wheel 104 is positioned so as to want to follow a downwardly directed path. Movement of the wheel 104 along such downwardly directed path is, however, prevented by the top wheel 98, causing the side wheel 104 to frictionally slide relative to the side surface 74 and to thereby impose a downwardly directed force on the frame end portion 82.

Since the end portion 82 of the main frame includes no bottom wheel for positively restraining the end portion 82 against upward movement relative to the table it is possible that the end portion 82 might inadvertently be lifted sufficiently to remove the side wheel 104 from engagement with the adjacent side surface 74 of the table. To prevent any significant lateral movement of the carriage main frame relative to the table in the event of such occurrence, the bottom wheel 118 carried by the opposite end portion 80 of the main frame includes a flange member 119 adjacent the inboard end of the wheel 118 and extending radially outwardly therefrom so as to be engagable with the vertical surface 121 defining the inboard limit of the bottom surface 76 and which surface 121 extends along the length of the table.

At its left-hand end, as seen in FIG. 2, the carriage main frame 30 also carries a housing 136 carrying various components making the carriage 10 a completely self-contained unit requiring connection only to a source of electrical power, as through the electrical power line 138 of FIG. 1, to make the carriage 10 and its associated labeller 24 operable. These components, for example, may include an electrical power supply for converting the power supplied through the line 138 to the proper voltages required by the other components of the carriage, and a control system for controlling the labeller and the electric drive motors 86 and 100 in response to the position information associated with the labels used by the labeller and also in response to various manual control signals which may be entered through a control console 140 carried by the main frame of the carriage adjacent the end portion 82. Also included in the housing 136 is a means providing pressurized air for use by the cylinders 114 and 124, such means comprising an air pump, a drive motor for the pump and an associated pressurized air tank as illustrated schematically in FIG. 6.

Referring to FIG. 6, the air supply system for operating the air cylinders 114 and 124 is there shown schematically and comprises an electric drive motor 142 driving an air pump 144 to supply pressurized air to a storage tank 146. The pressure of the air in the tank 146 is sensed by a pressure switch 148 which through a relay 150 controls the electrical power, supplied on a line 152, to the motor 142 as needed to maintain the pressure in the tank 146 at a desired level. Pressurized air from the tank 146 is supplied to the labeller 24 for operating components of it; and it is also supplied to each cylinder 124 and 114 through an adjustable pressure control valve 154 having a manually operable control knob 156 which may be operated to control the pressure of the air supplied to the associated cylinder and to therefore control the force with which the associated wheel 118 or 102 is urged against its associated table surface. Each cylinder 124 and 114 is a single acting one and includes a return spring 158 which moves the associated wheel 118 or 104 to its disengaged position when the supply of pressurized air to the cylinder is terminated as by operation of a valve 160 by means of which the line 162 supplying the cylinders 124 and 114 may be selectively connected either to the pressurized air supply tank 146 or to atmosphere.

As mentioned, the lifting and transport cart 34 of FIG. 1 may take various different forms. FIG. 7 shows an alternate form 34a of the cart wherein the lifting structure instead of being vertically slidable relative to the vertical portion 48 of the cart consists of a lifting arm 164 pivotally connected to the vertical portion 48 for movement about a horizontal pivot axis 166. Connected between the lifting arm 164 and the vertical cart portion 48 is a toggle link mechanism 168 having a manually operable lever 170 manually moveable between the illustrated full line and broken line positions to pivot the lifting arm 164 between the corresponding full line and broken line positions. By virtue of the construction of the toggle link mechanism 168 the operating handle 170 releasably holds whichever one of the broken line or full line positions to which it is moved. The lifting arm 164 includes two hooks 172 engagable with eyes 174 on the main frame 30 of the carriage as shown in FIG. 7. After the hooks 172 are engaged with the eyes 174 the lifting arm, by operation of the lever 170, may be moved to the illustrated broken line position to tiltingly lift the carriage from the table 14 sufficiently to allow the carriage to be thereafter transversely removed from the table by moving the cart 34a to the left in FIG. 7, the carriage 10 thereafter being moveable by the cart 34a to and into working relationship with a new table.

Figure 8:
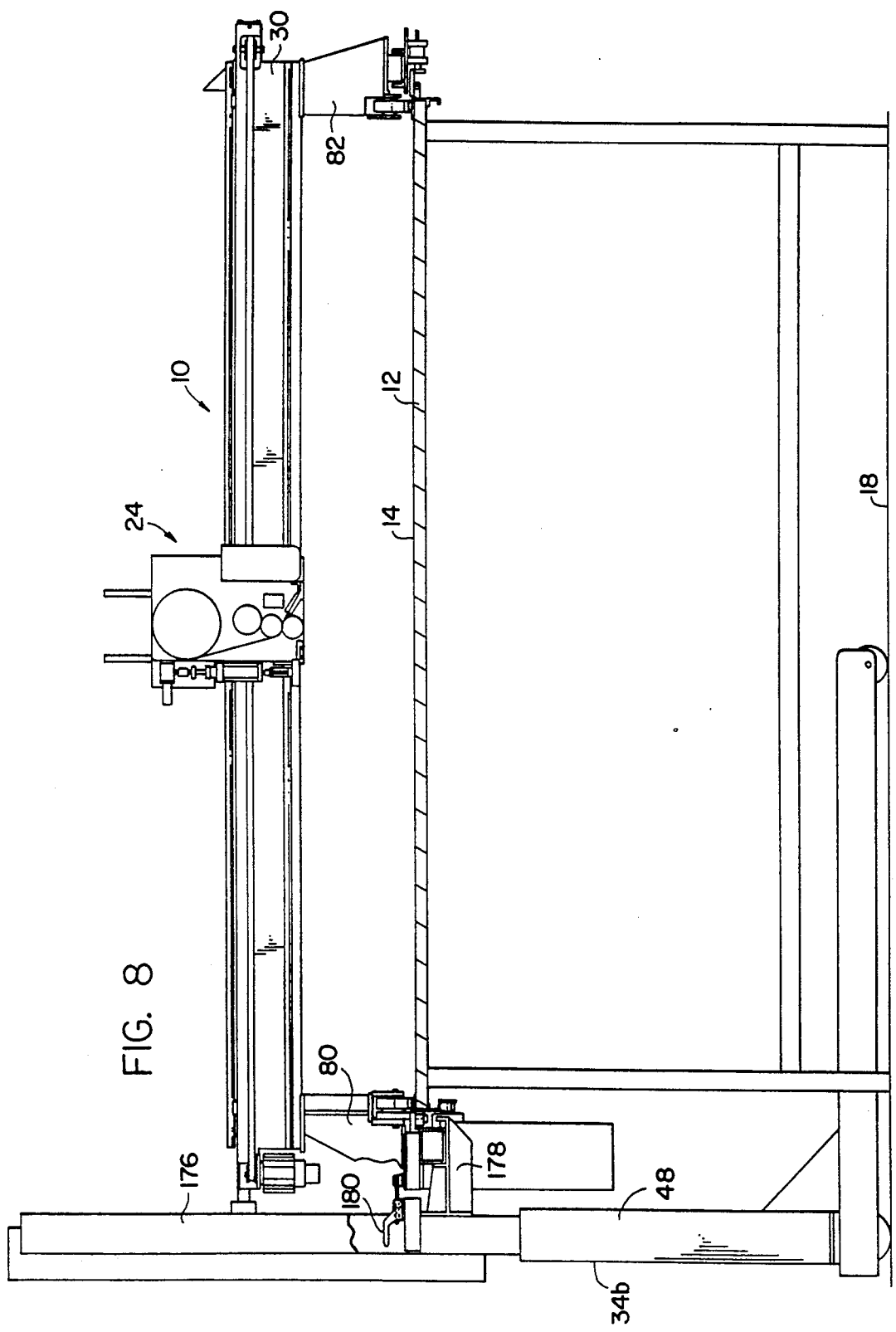

FIGS. 8, 9 and 10 show yet another form 34b of the lifting and transport cart. In this version of the cart the lifting structure includes an upper lifting body 176 supported by the vertical portion 48 of the cart base for vertical sliding movement relative thereto with there being a hand-operated jack similar to the jack 62 of FIG. 1 between the vertical portion 48 and the lifting body 176 for manually raising and lowering the body 176 relative to the vertical portion 48. Received on the lifting body 176 are two short lifting arms 178 (only one of which is shown) which by manipulation of the cart 34b are moveable to the position shown in FIG. 8 at which they underlie the left-hand portion 80 of the main frame. Two latches 180, each associated with the respective one of the lifting arms 178 are then operable to releasably connect the end portion 80 to the lifting body 176. The lifting body 176 is then raised relative to the vertical portion 48 to move the carriage 10 to the raised position shown in FIG. 9 and to thereby allow the cart 34b to be moved over the floor 18 to remove it and the carriage 10 from the table 12. Then, as shown in FIG. 10, a stabilizing bar 182 carried by the bottom portion of the base 38 and normally lying in the illustrated broken line position may be raised, by pivoting about the axis 184 relative to the bottom portion 38, to the vertical position shown by the full lines of FIG. 10 at which it supportingly engages the carriage 10 to stabilize it while the cart 34b is moved to transport the carriage to a new table.

If conditions permit, the carriage 10 may also be moved off of one table and onto another table by use of a transfer table or wagon generally similar to that of U.S. Pat. No. 3,776,074 which transfer table when positioned at the end of a work table essentially forms a continuation of that table and allows the carriage 10 to be moved onto or off of the transfer table by being moved longitudinally of the work table and onto or off of the transfer table. Also, if conditions permit, the carriage 10 may be moved from the end of the table and onto the end of another table using a lifting and transport cart the same as or generally similar to the cart 34, 34a or 34b described above but modified, if need be, to be able to releasably grasp and lift or lower the carriage 10 from or onto the end of a table when the cart is positioned adjacent the same table end.

We claim:

1. A work tool carriage for use at different times with different ones of a plurality of generally rectangular work tables supporting sheet material to be worked upon and each having a top, a bottom and two side surfaces, said carriage comprising:
    a main frame which when the carriage is in working association with a work table extends transversely across the table,
    a plurality of top wheels carried by said main frame and engageable with the top surface of a table for supporting said main frame for movement along the length of the table,
    at least two side wheels carried by said main frame and engagable respectively with the two side surfaces of a table to restrain said main frame against lateral movement relative to the table,
    at least one bottom wheel, and
    a means mounting said at least one bottom wheel for movement relative to said main frame between an engaged position at which said bottom wheel is engageable with the bottom surface of the table to prevent said main frame from being moveable upwardly relative to the table and a disengaged position at which said at least one bottom wheel is positioned so as to free said main frame for vertical movement relative to a table to allow said carriage to be lifted vertically off of one table, to be then moved to a second table, and to be lowered onto said second table.

2. A carriage as defined in claim 1 further characterized by said main frame having first and second end portions located respectively in the vicinity of the two side surfaces of a table with which said carriage is associated,
    there being two of said top wheels associated with said first end portion of said main frame and spaced from one another along the length of a table,
    there being one of said top wheels associated with said second end portion of said main frame,
    said at least one bottom wheel constituting a single bottom wheel carried by said first end portion of said main frame;
    there being two of said side wheels associated with said one end portion of said main frame, and
    there being one of said side wheels associated with said second end portion of said main frame.

3. A carriage as defined in claim 2 further characterized by means for mounting said one side wheel associated with said second end portion of said main frame for movement relative to said main frame between an engaged position at which said one side wheel engages the adjacent side edge of the table to, in co-operation with the two side wheels associated with the first end portion of said main frame, hold said main frame to said table without lateral play, and a disengaged position, at which disengaged position substantial lateral play is present between the table and said side wheels so that said carriage may be moved vertically relative to a table without hindrance by said side wheels.

4. A carriage as defined in claim 3 further characterized by:
    said one side wheel associated with said second end portion being effective when in said engaged position and when said main frame is moved in one direction or the other along the length of a table to exert downwardly directed force on said main frame assisting gravity in urging said second end portion of said main frame toward the associated table.

5. A carriage as defined in claim 3 further characterized by:
    means for mounting said one side wheel to said second end portion of said main frame for limited movement of the rotational axis of said one side wheel about a horizontal axis extending transversely of the associated table so that as said main frame moves in one direction or the other along the length of a table the rotational axis of said one side wheel is moved to a position at which said rotational axis extends upwardly from said one wheel and forwardly with respect to the direction of movement of said main frame to cause said one wheel in its rolling engagement with said table to exert a force on said second end portion of said main frame having a downwardly directed component urging said second end portion of said main frame downwardly toward said table.

6. A carriage as defined in claim 1 further characterized by:
    means on said main frame engagable by a lifting device for moving said main frame vertically relative to a table in the course of moving the carriage onto or off of the table.

7. A carriage as defined in claim 1 further characterized by:
    said means for moving said bottom wheel between its engaged and disengaged positions including a first pressurized air operated motor for effecting said movement of said bottom wheel, said means for moving said one side wheel between its engaged and disengaged positions being a second pressurized air operated motor for effecting said movement of said one side wheel, an air pump carried by said main frame for supplying pressurized air to said first and second air motors, and an electric motor carried by said main frame for driving said air pump.

8. A carriage as defined in claim 7 further characterized by:

each of said first and second air operated motors being a single acting air cylinder moved toward the associated engaged position by the application of pressurized air thereto and upon the termination of the application of pressurized air thereto being moved to the associated disengaged position by a spring, and means for varying the pressure of the pressurized air supplied to each of said first and second air operated motors for carrying the force with which said bottom roller is urged against said bottom surface of a table and the force with which said on side wheel is urged against the adjacent one of said side surfaces of a table.

9. A carriage as defined in claim 2 further characterized by:

means including a motor on said main frame for driving one of said two top wheels of said first end portion of said main frame to propel said main frame along the length of a table, and said bottom wheel being located directly below said driver one of said two top wheels of said first end portion of said main frame.

10. A carriage as defined in claim 1 further characterized by:

a sub-frame carried by said main frame for movement relative to said main frame in a direction transversely of the table with which said main frame is associated, a labeller carried by said sub-frame for applying labels to the top surface of sheet material supported by said table with which said main frame is associated, a supply of labels for use with said labeller with there being associated with each label of the supply a position code indicating the position at which the related label is to be applied to the top surface of the sheet material supported by the associated table, means including a first electric motor for driving at least one of said top wheels to move said main frame longitudinally of the associated table, means including a second electric motor for moving said sub-frame relative to said main frame in said direction extending transversely of the associated table, and a control means carried by said main frame for reading the position code associated with each label and for operating said first and second motors and said labeller to cause said labeller to apply each label to the top surface of the sheet material supported by the table at the position dictated by its associated position code, whereby the components for operating said carriage and labeller are carried by said main frame so that only electrical power need be supplied to said carriage to make it and said labeller operable.

11. A work tool carriage for use at different times with different ones of a plurality of generally rectangular work tables each having a length dimension and a width dimension and each having an upwardly facing surface for supporting sheet material to be worked on and a downwardly facing surface extending along said length dimension, said carriage comprising:

a main frame which when the carriage is in working association with a work table such as aforesaid extends transversely across the table parallel to its width dimension, a sub-carriage for carrying a work tool and which sub-carriage is carried by said main frame for movement along its length and transversely of the table with which said main frame is associated, means carried by said main frame and engagable with a table for supporting said main frame for movement along the length dimension of the table so that by combined movement of said main frame along the length dimension of a table and of said sub-carriage along the length of said frame a work tool carried by said sub-carriage may be moved to any point and along any line on the supporting surface of the table, lateral movement restraining means carried by said main frame and engagable with a table to restrain said main frame against lateral movement relative to the table, and upward movement restraining means carried by said main frame and engagable with a table to restrain said main frame from being moveable upwardly relative to the table, said upward movement restraining means being a wheel carried by said main frame and moveable relative to said main frame between an engaged position at which it is engagable with said downwardly facing surface of a table to restrain upward movement of said main frame relative to said table and a disengaged position at which it is freed from said downwardly facing surface of said table so as to be ineffective to restrain upward movement of said main frame relative to said table to allow said carriage to be lifted vertically off of said table, to be then moved to another table, and to then be lowered onto said another table, after which said wheel may be returned to said engaged position to restrain upward movement of said main frame relative to said another table.

12. A work tool carriage for use at different times with different ones of a plurality of generally rectangular work tables each having a length dimension and a width dimension, said carriage comprising:

a main frame which when the carriage is in working association with a work table extends transversely across the table parallel to its width dimension, a sub-carriage for carrying a work tool and which sub-carriage is carried by said main frame for movement along its length and transversely of the table with which said main frame is associated, means carried by said main frame and engagable with a table for supporting said main frame for movement along the length dimension of the table, lateral movement restraining means carried by said main frame and engagable with a table to restrain said main frame against lateral movement relative to the table, and upward movement restraining means carried by said main frame and engagable with a table to restrain said main frame from being moveable upwardly relative to the table, said upward movement restraining means being moveable relative to said main carriage between an engaged position at which said means is effective to restrain upward movement of said main frame relative to a table and a disengaged position at which said means is ineffective to restrain upward movement of said main frame relative to a table so that when said upward movement restraining means is in said disengaged position said main frame is free to be moved vertically relative to a table to allow said carriage to be lifted vertically off of one table, to be then moved to a second table, and to be lowered onto said second table, said lateral movement restraining means being moveable relative to said main frame between an engaged position at which said means is effective to restrain lateral movement of said main frame relative to the table with which it is associated and a disengaged position at which said means is ineffective to restrain said lateral movement so that when said lateral movement restraining means is in said disengaged position said main frame is laterally loose relative to the table so that said lateral movement restraining means does not inhibit vertical movement of said main frame relative to the table.

13. A carriage for carrying and moving a labeller or other work tool relative to sheet material supported on any one of a number of generally rectangular tables each having two sides and two ends and having a first marginal portion extending along one side thereof and a second marginal portion extending along the opposite side thereof, said first marginal portion of said table defining a first vertical side edge surface extending along and facing outwardly from said one side of said table, a first upwardly facing horizontal surface extending along said one side of said table in the vicinity of said first side edge surface, and a downwardly facing surface located below said first upwardly facing horizontal surface and extending along said opposite side of said table in the vicinity of said first side edge surface, and said second side marginal portion of said table defining a second vertical side edge surface extending along and facing outwardly from said opposite side of said table, and a second upwardly facing horizontal surface extending along said opposite side of said table in the vicinity of said second side edge surface, said carriage comprising:

a main frame which when said carriage is received on a table as such as aforesaid extends transversely across said table and has first and second end portions located respectively in the vicinity of said first and second marginal portions of said table, first supporting means carried by said first end portion of said main frame for supportingly engaging said first marginal portion of said table for movement of said main frame along said first marginal portion, and second supporting means on said second end portion of said main frame for supportingly engaging said second marginal portion of said table for movement of said main frame along the length of said second marginal portion, said first supporting means including at least two wheels carried by said first end portion of said frame for rotation about horizontal axes extending transversely of said table for rolling contact with said first upwardly facing surface at points spaced from one another along the length of said first marginal portion, at least one side wheel carried by said first end portion of said frame for rotation about a vertical axis for rolling contact with said first side edge surface, and a bottom wheel carried by said first end portion of said frame for rotation about a horizontal axis extending transversely across said table for rolling contact with said second upwardly facing surface, and a side wheel carried by said second end portion of said frame for rotation about a vertical axis for rolling engagement with said second side edge surface, said first supporting means also including means mounting said bottom wheel for movement relative to said first end portion of said main frame between an engaged position at which said bottom wheel is in rolling engagement with said downwardly facing surface and a disengaged position at which said bottom wheel is located outwardly with respect to said one side of said table from the vertical plane containing said first side edge surface, whereby when said bottom wheel is in said disengaged position said main frame may be moved vertically relative to said table to allow said carriage to be lifted vertically off of one table, to be then moved to a second table, and to be lowered onto said second table.

14. A carriage as defined in claim 13 further characterized by:

means carried by said main frame for driving at least one of said wheels to move said main frame in a direction parallel to said sides of said table.

15. A carriage as defined in claim 13 further characterized by:

means mounting one of said side wheels to the associated one of said end portions of said main frame for movement of its rotational axis relative to said main frame toward and away from the associated side edge surface of said table between a first position at which said table is tightly received between the ones of said side wheels located on the opposite sides of said table and a second position at which said table is loosely received between the side wheels located on said opposite sides of said table.

16. A carriage as defined in claim 13 for use with tables of a type wherein said downwardly facing surface terminates a short distance inboard of the side edge surface of said first marginal portion and at its inboard side meets a guide surface extending upwardly therefrom and also extending along its length, which carriage is further characterized by:

a radially outwardly extending flange at the inboard end of said bottom wheel which flange when said bottom wheel is in the engaged position is located outboard of said guide surface and is engagable with said guide surface to limit lateral movement of said main frame relative to the associated table in the direction tending to move said flange toward said guide surface.

* * * * *